(12) United States Patent
Zelenov

(10) Patent No.: US 8,693,368 B2
(45) Date of Patent: Apr. 8, 2014

(54) METHOD AND SYSTEM FOR REMOTE IDENTIFICATION OF A NETWORK NODE

(75) Inventor: Serge Zelenov, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 671 days.

(21) Appl. No.: 12/507,734

(22) Filed: Jul. 22, 2009

(65) Prior Publication Data

US 2011/0019583 A1 Jan. 27, 2011

(51) Int. Cl.
*H04L 12/28* (2006.01)

(52) U.S. Cl.
USPC ............................ 370/254; 370/238; 370/328

(58) Field of Classification Search
None
See application file for complete search history.

(56) References Cited

U.S. PATENT DOCUMENTS

| | | | |
|---|---|---|---|
| 5,493,287 A * | 2/1996 | Bane | 340/9.11 |
| 6,418,129 B1 * | 7/2002 | Fingerhut | 370/328 |
| 6,978,128 B1 * | 12/2005 | Raman et al. | 455/414.1 |
| 7,319,394 B2 * | 1/2008 | Sheller | 340/572.1 |
| 2005/0117538 A1 * | 6/2005 | Van Ewijk et al. | 370/328 |
| 2007/0280303 A1 * | 12/2007 | Koch et al. | 372/4 |
| 2008/0037482 A1 | 2/2008 | Douglas et al. | |

OTHER PUBLICATIONS

Ros, M. et al., Using wireless sensors as selection devices for a multimedia guidebook scenario. Workshop on Real-World Wireless Sensor Networks REALWSN'05, Stockholm, Sweden, (1-5). Jun. 20-21, 2005.

* cited by examiner

*Primary Examiner* — Robert Wilson

(57) ABSTRACT

A method for remote identification of a network node of a network is described herein. The network includes a plurality of network nodes and each network node of the plurality of network nodes corresponds to an identifier. An activation signal is received by the network node. In response to receiving the activation signal, a message including information identifying the network node is sent. The identifier corresponding to the network node is determined by a remote node of the network based on the message.

19 Claims, 5 Drawing Sheets

METHOD AND SYSTEM FOR REMOTE IDENTIFICATION OF A NETWORK NODE

I. BACKGROUND

The Institute of Electrical and Electronics Engineers ("IEEE") established the wireless local area network ("LAN") standard, in the IEEE 802.11 Working Group. The standard has generated various activities related to the development and implementation of small scale wireless networks and discussions of large scale wireless networks. In typical implementations, wireless access points (APs) are provided at various locations that allow a wireless communication device to access a network such as a wide area network (WAN) or a local area network (LAN).

Often times, APs installed across large areas appear to be identical and are visually indistinguishable making the identity of the AP unascertainable for example, by a technician or other person. The similar appearance of APs and the lack of visibility of an identifier make it difficult to identify a specific AP among a group of APs, such as for troubleshooting, configuration, or other purposes.

II. BRIEF DESCRIPTION OF THE DRAWINGS

III. DETAILED DESCRIPTION OF THE INVENTION

A network node that is visible but not physically accessible may be remotely identified. A user having line-of-sight visibility to a network node of interest may remotely tag the device by sending an activating signal. In response, the tagged network node provides a response message with self-identifying information that is used to distinguish the tagged network node from other similar devices within proximity.

Figure 1:
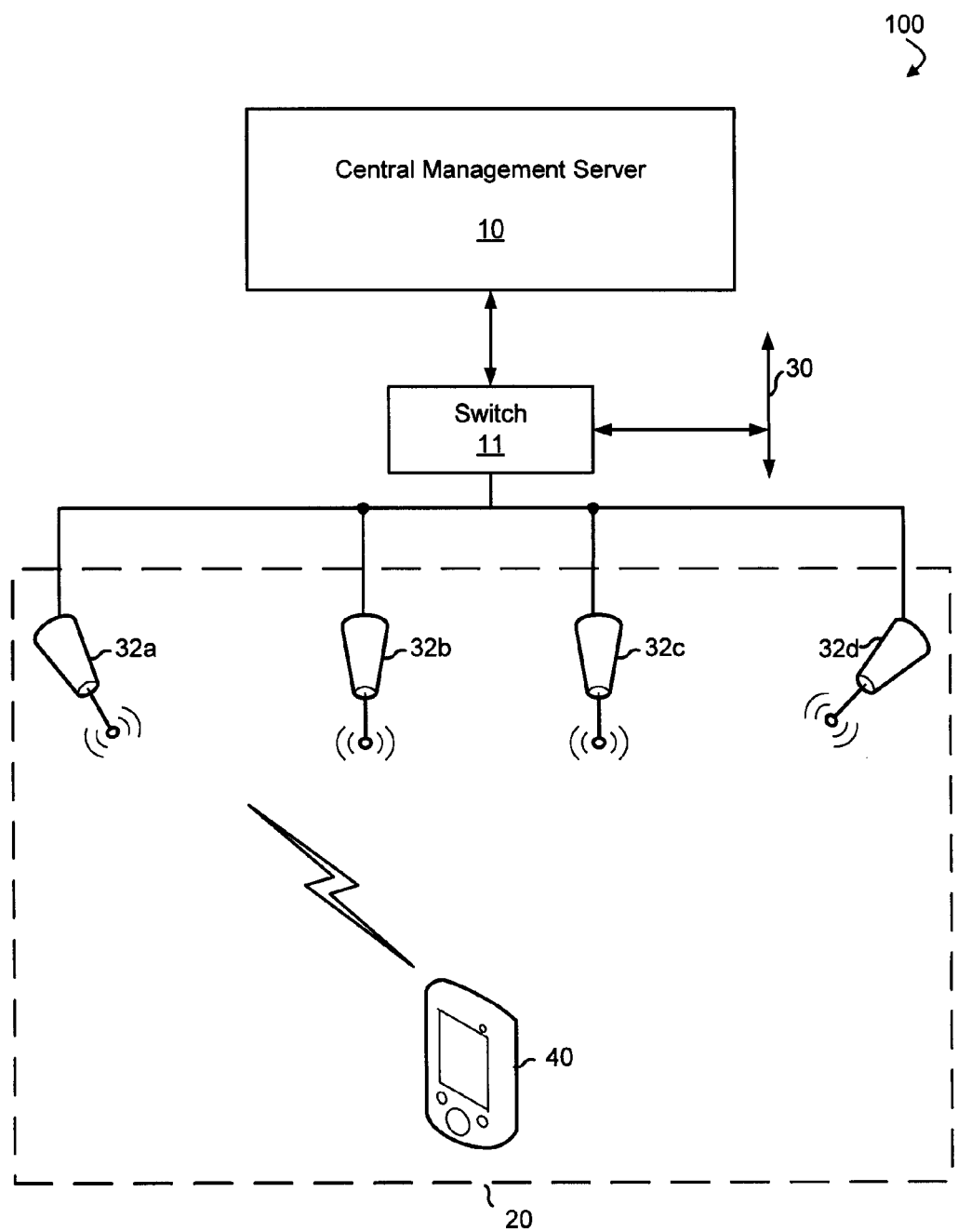
FIG. 1 is topological block diagram of a network system in accordance with an embodiment of the invention.

FIG. 1 is topological block diagram of a network system 100 in accordance with an embodiment of the invention. System 100 includes a central management server 10, network switch 11, a local area network (LAN) 30, and wireless access points 32a, 32b, 32c, and 33d (collectively referred to as wireless access points 32). Central management server 10 is configured to plan, deploy, manage, and/or monitor a network such as a wireless local area network (WLAN). Central management server 10 is operatively coupled to network switch 11. The connection between central management server 10 and network switch 11 may include multiple network segments, transmission technologies and components.

LAN 30 is implemented by one or more network switches, such as network switch 11, and/or other network devices, such as a bridge. LAN 30 may be a LAN, LAN segments implemented by an Ethernet switch or an array of switches having multiple ports.

Network switch 11 is operatively coupled to central management server 10 and LAN 30. Network switch 11 includes multiple ports to which wireless access points 32 are connected. In one embodiment, wireless access points 32 are arranged in a physical location 20 that is central to wireless clients. The arrangement optimizes wireless connections in both horizontal and vertical directions. Physical location 20 may include a room in a building or an outdoor space.

Tagging device 40 is communicatively coupled with one or more of wireless access points 32 and is a remote device configured to tag a wireless access point of interest. In one embodiment, tagging device 40 is configured to generate and send an activation signal. Tagging device 40 may be a wireless client, portable wireless client (e.g., a laptop, a handheld device), a laser pointer which projects a beam or signal onto a target wireless access point (AP), or any device capable of generating a signal. The signal may be generated by a laser device operating in a continuous wave mode, a laser device operating in a pulsed mode producing varying binary (i.e., on/off) patterns, a radio signal, or the like.

Typically, wireless access points 32 are installed at a high elevation, such as at a ceiling line in a room, to optimize connectivity. Such elevated installations make identification of the network nodes quite difficult. In some installations, wireless access points 32 are mounted in weather-proof enclosures, which also make identification difficult.

One or more of wireless access points 32 are configured to receive an activation signal from tagging device 40 and to provide a response message with self-identifying information. For example, a response message with self-identifying information may be provided to central management server 10 or to a preconfigured central log server, or sent to a display system embedded on the wireless access point. The self-identifying information may be displayed. The embedded display system includes a display board (e.g. LCD) which displays the self-identifying information in a natural language, lights (e.g. LEDs) on the wireless access device telegraphically displays the self-identifying information, for example, by encoding the information in American Standard Code for Information Interchange (ASCII) and displaying the encoded information on LEDs as binary digits. In alternative embodiments, the response message may be broadcast using a transmitter and an antenna in the wireless AP, or otherwise provided to tagging device 40 or other devices within broadcast range.

Wireless access points 32 may be further configured to perform procedures in response to receiving the activation signal. The procedures may include one or more of populating an internal log with a timestamp of the tagging event (i.e., receipt of the activation signal), and performing a predefined action based on the specific signal received, such as running a self-diagnostic, shutting down, etc.

Wireless access points 32 may be equipped with sensors for receiving and/or detecting the activation signal. A light sensor, such as a cadmium-sulfide (CdS) light sensor photocell, may be used to receive an activating signal in the form of a laser. In another embodiment, the activation signal in the form of a radio signal may be received via a wireless network interface. A module within the wireless access points 32 is configured to generate a response message including self-identifying information.

As such, wireless access points 32 may be quickly and easily identified regardless of a lack of physical accessibility or a lack of visibility of an identifier on the device. Furthermore, identification is possible without service disruption of a wireless AP of interest. Additionally, in some embodiments, wireless access points 32 may be identified even if participation by the central control is not possible.

The present invention can also be applied in other network topologies and environments. Network 100 may be any type of network familiar to those skilled in the art that can support data communications using any of a variety of commercially-available protocols, including without limitation TCP/IP, SNA, IPX, AppleTalk, and the like. Merely by way of example, network 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Various software and hardware components may be included to support remote identification of a network node.

Figure 2:
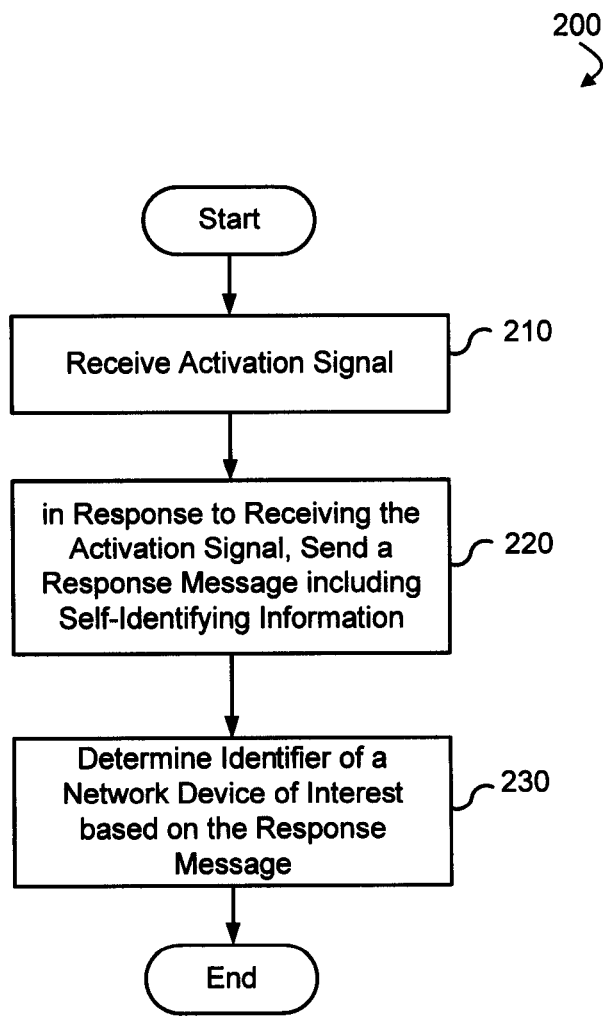
FIG. 2 is a process flow diagram for determining the identity of a network node in accordance with an embodiment of the invention.

FIG. 2 is a process flow diagram 200 for determining the identity of a network node in accordance with an embodiment of the invention. The depicted process flow is carried out by execution of one or more sequences of executable instructions. In another embodiment, the process flow is carried out by execution by components of a network node, an arrangement of hardware logic, e.g., an Application-Specific Integrated Circuit (ASIC), etc.

During network configuration, each network node, such as a wireless access point (AP), within the purview and control of a central management server may be assigned a unique identifier.

A network node may be determined to be a network node of interest without knowledge of the identifier associated therewith. For example, reports may be received that network connectivity is strained at a location proximate to a particular wireless AP, LEDs of the particular wireless AP may indicate a service disruption status, a network administrative technician may determine that various wireless APs will be grouped together in such as for load balancing, and other scenarios. Even though wireless APs may be determined to be network nodes of interest, the identifier of those devices may not be readily accessible or may be otherwise unknown.

An identifier of a network node of interest may be determined at a location remote to the network node of interest. At step 210 an activation signal is received, for example, by the network node of interest. In one embodiment, the activation signal is a laser signal.

At step 220, a response message including self-identifying information is sent in response to receiving the activation signal. In one embodiment, the signal activates the network node of interest to generate and send the response message to a destination device. The destination device may include the central management server, a wireless client, portable wireless client (e.g., a laptop, a handheld device), the device which sent the activating signal, or any device capable of receiving the response message. The response message includes self identifying information, which may include the identifier or other data which distinguishes one network node from another.

The identifier of the network node of interest is determined at step 230 based on the response message. In one embodiment, the determination is made by the central management server, the device which was the source of the activation signal, or other device remote from the network node of interest. The response message may include the identifier itself or may include other data which can be used to determine the identifier. For example, the identifier may be inferred from the source address of an otherwise empty response message (e.g. IP address, Media Access Control (MAC) address, or any other software or hardware address that is unique on the network). Also, the identifier may be inserted into the response message by the activated network node based on some preconfigured information (e.g. device serial number, any network-unique assigned device name, Simple Network Management Protocol (SNMP) contact/location fields, etc.). The activated device may send other self-identifying information that may index into an entry of a look-up table which maps to the identifier.

By determining the identifier of the network device of interest, it can be determined which network node was activated to send the response message. As described herein, the process for remote identification is an elegant and non-disruptive solution which can, in some embodiments, use commercially available laser pointers or other devices to tag the network node of interest. Physical access to the device of interest is not required. The network node of interest is identified quickly without going through a lengthy process of elimination.

Figure 3:
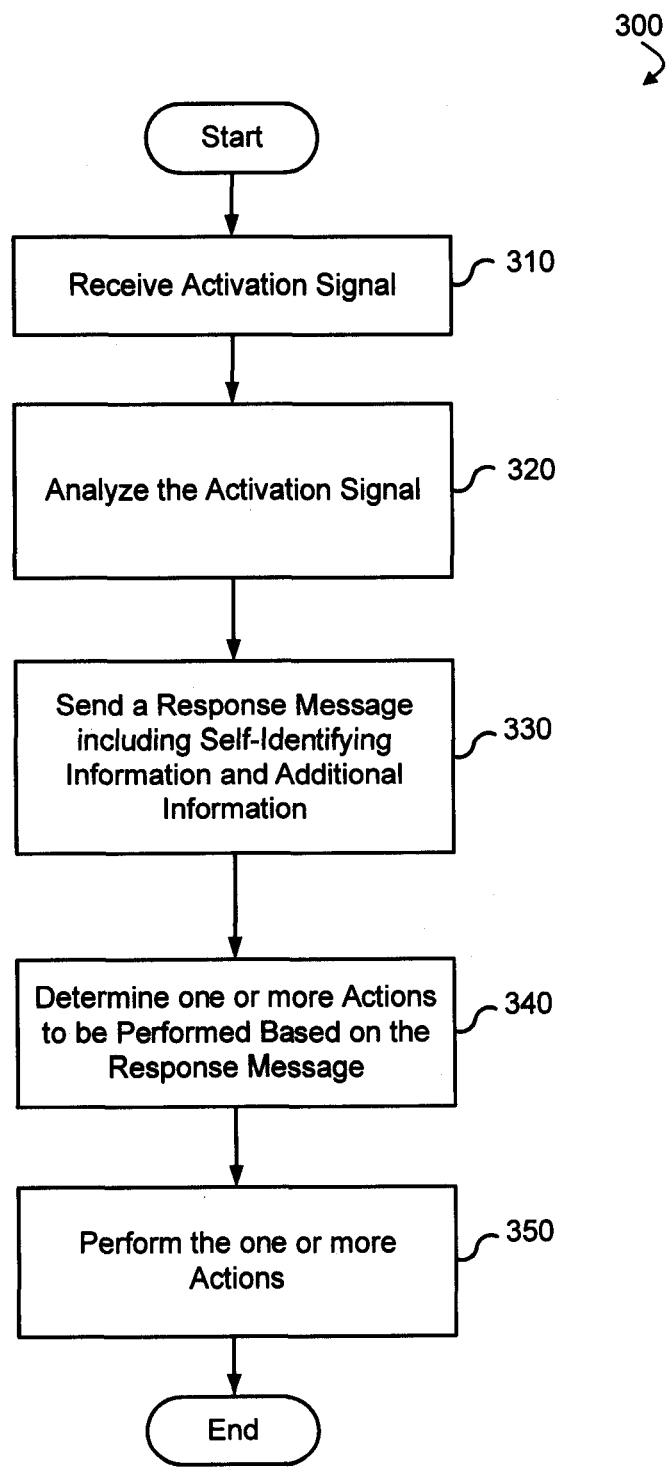
FIG. 3 is another process flow diagram for determining the identity of a network node in accordance with an embodiment of the invention.

FIG. 3 is another process flow diagram for determining the identity of a network node in accordance with an embodiment of the invention. The depicted process flow is carried out by execution of one or more sequences of executable instructions. In another embodiment, the process flow is carried out by execution by components of a network node, an arrangement of hardware logic, e.g., an Application-Specific Integrated Circuit (ASIC), etc.

During network configuration, each network node, such as a wireless access point (AP), may be assigned a unique identifier. In one embodiment, wireless APs within the purview and control of a central management server may be assigned an identifier unique within the system controlled by the server. Actions may be performed by a remote device such as the central management server using the identifier. Actions may include adding the network node to a list of devices to monitor, configuring the network node, grouping a set of network nodes for load balancing, etc.

At step 310, an activation signal is received, for example, by the network node of interest. As previously described, the signal may be a beam operating in a continuous wave mode, a beam operating in a pulsed mode producing varying binary patterns, a radio signal, or the like.

At step 320, the activation signal is analyzed. The activation signal may have been communicated using a specific binary pattern. Analysis may be performed to determine a binary pattern of the activation signal. One or more pre-defined procedures to be performed at the network device may be mapped to the binary pattern. The procedures may include populating an internal log with a timestamp of when the activation signal was received, performing internal actions such as running a self-diagnostic, shutting down, etc.

A response message including self-identifying information and additional information is sent at step 330. In one embodiment, the additional information is determined as a result of analyzing the activation signal. For example, the activation signal may have been communicated using the binary pattern. The additional information of the response message may include one or more of a reference to the binary pattern, information for technical support, an event log or portion thereof, statistics regarding process utilization, reboot information, etc. The response message is sent to a destination device.

At step 340, one or more actions to be performed are determined based on the response message. The additional information in the response message may be processed. For example, a remote node, such as the central management server, may be configured to perform varying actions depending upon the binary pattern. The binary pattern referenced in the response message may map to one or more actions to be performed by the central management server or other remote node. As previously described, the actions may include adding the network node to a list of devices to monitor, configuring the network node, grouping a set of network nodes for load balancing, etc.

At step 350, the one or more actions are performed, for example, by the central management server or other network node remote from the network device. For example, the binary pattern referenced in the response message maps to a particular group. A plurality of wireless APs may be grouped (into cluster groups, fail-over groups, etc.) for load balancing and other purposes. A binary pattern comprising a two short blinks may organize a wireless AP into a first group and a binary pattern comprising one short blink followed by one long blink may organize the wireless AP into a second group.

Figure 4:
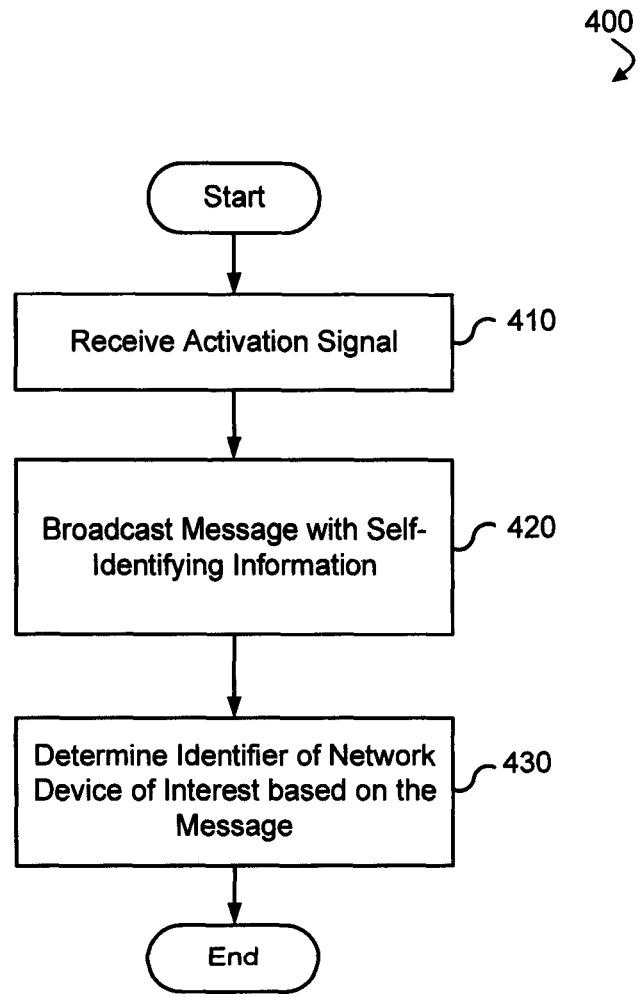
FIG. 4 is yet another process flow diagram for determining the identity of a network node in accordance with an embodiment of the invention.

FIG. 4 is yet another process flow diagram for determining the identity of a network node in accordance with an embodiment of the invention. The depicted process flow is carried out by execution of one or more sequences of executable instructions. In another embodiment, the process flow is carried out by execution by components of a network node, an arrangement of hardware logic, e.g., an Application-Specific Integrated Circuit (ASIC), etc.

A network node of interest may be identified remotely. At step 410, an activation signal is received, for example, by the network node of interest. A message with self-identifying information is generated and at step 420 the message is broadcast, for example by the network node of interest. The message may be broadcast according to any of the IEEE 802.11 suite of protocols, the Bluetooth protocol known in the art, and/or any other wireless protocol.

At step 430, an identifier of the network node of interest is determined based on the message. In one embodiment, a first remote device sends the activation signal and a second remote device receives the broadcast message. In another embodiment, the first remote device and the second remote device are one in the same, such that the same remote device which sent the activation signal is the remote device which receives the broadcast message and determines the identifier of the network node of interest. For example, a portable wireless client may send the activation signal to a wireless AP and may also receive the broadcast message. Upon determining the identifier of the network node of interest, such as a wireless AP, the identifier may be displayed via a user interface. In this embodiment, the portable wireless client and the wireless AP engage in a two-way communication.

Figure 5:
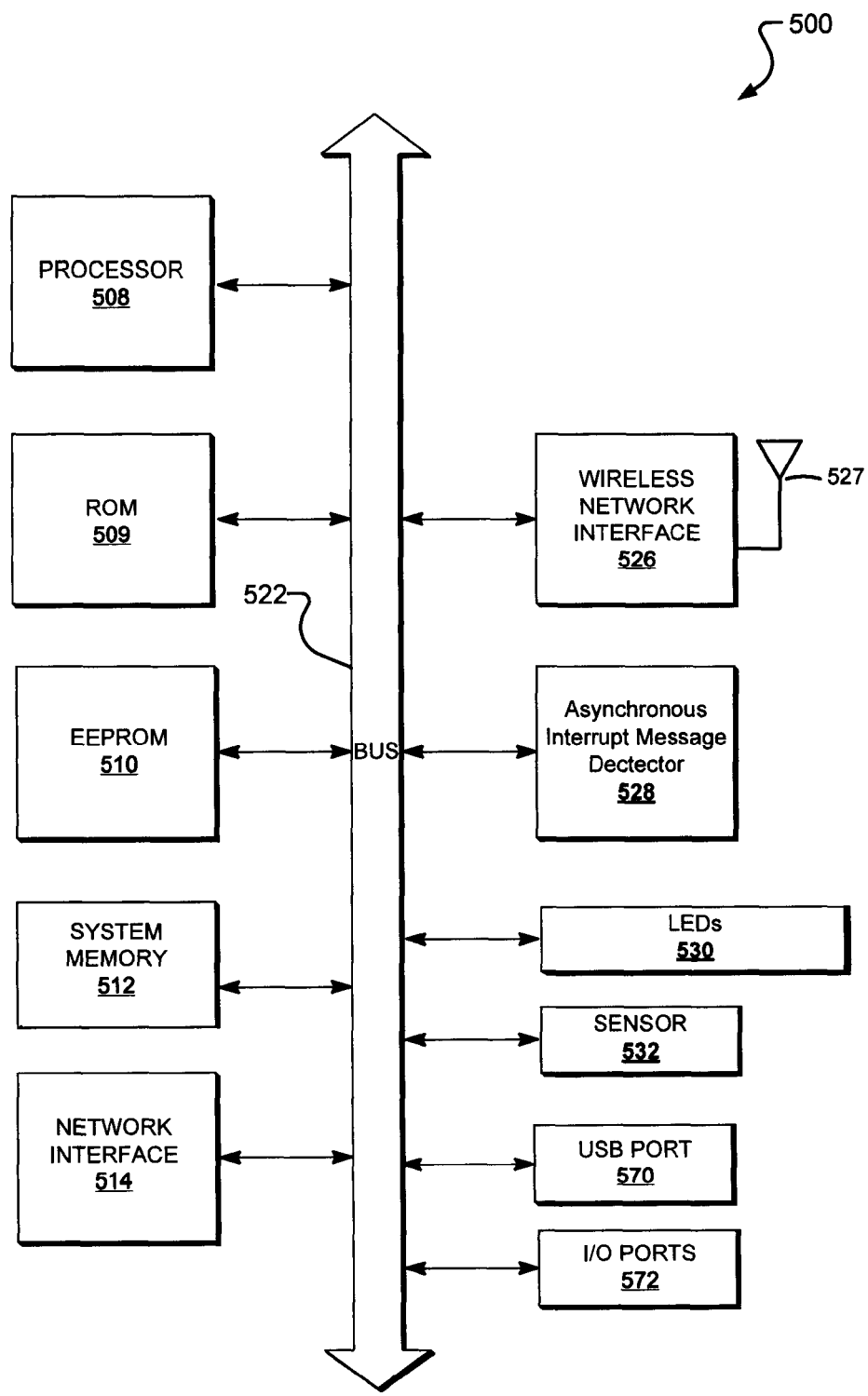
FIG. 5 is a block diagram of an exemplary wireless access point in accordance with an embodiment of the invention.

FIG. 5 is a block diagram of an exemplary wireless access point 500 in accordance with an embodiment of the invention. In one implementation, the wireless access point (AP) 500 comprises a processor 508, a read-only memory (ROM) 509, and an electronically erasable programmable read-only memory (EEPROM) 510.

The wireless AP 500 may also include one or more of the following: a system memory 512, a network interface 514 (e.g., an 802.3 interface) for communication with a LAN, a wireless network interface 526 (e.g., an IEEE 802.11 WLAN interface) having an antenna 527 for communication with a wireless LAN (WLAN), an asynchronous interrupt message detector 528, LEDs 530, a sensor 532 for receiving and/or detecting an activation signal, a USB port 570, and I/O ports 572. Sensor 532 is shown as being internally incorporated into wireless AP 500. In one embodiment, sensor 532 may be externally attached to wireless AP 500 via USB port 570. The wireless AP 500 may also include and a system bus 522 interconnecting these components.

In operation, the activation signal is received via wireless network interface 526 or sensor 532. Sensor 532 may be a light sensor, such as a cadmium-sulfide (CdS) light sensor photocell, and may be used to receive an activating signal in the form of a laser.

Asynchronous interrupt message detector 528 is configured to detect that the received signal is an activation signal and to generate a message including self-identifying information upon detection of an activation signal. In one embodiment, asynchronous interrupt message detector 528 is a software or firmware module for generating a response message including the self-identifying information. In another implementation, asynchronous interrupt message detector 528 is implemented in hardware.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage medium that are suitable for storing a program or programs that, when executed, for example by a processor, implement embodiments of the present invention. Accordingly, embodiments provide a program comprising code for implementing a system or method as claimed in any preceding claim and a machine readable storage medium storing such a program.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method for remote identification of a network node of a network, the network including a plurality of network nodes, the method comprising:

receiving, from a tagging device, an activation signal by the network node, wherein each network node of the plurality of network nodes corresponds to a unique identifier; and in response to receiving the activation signal, sending a message including information identifying the network node, wherein the unique identifier corresponding to the network node is initially determined by the tagging device and a remote node of the network based on the message, wherein the network node is organized into a group by the remote node, and wherein a binary pattern of the activation signal maps to the group.

2. The method of claim 1, wherein the activation signal was generated as a result of operation of a laser device in a continuous wave mode.

3. The method of claim 1, wherein the activation signal was generated as a result of operation of a laser device in a pulsed mode.

4. The method of claim 1, wherein the information identifying the network node includes one of the unique identifier corresponding to the network node and data which distinguishes the network node.

5. The method of claim 1, further comprising:
    determining one or more predefined procedures mapped to the binary pattern;
    performing the one or more predefined procedures at the network node.

6. The method of claim 1, wherein the network node is a wireless access point.

7. The method of claim 1, wherein one or more actions are performed at the remote node upon receiving the message, and wherein the binary pattern of the activation signal maps to the one or more actions.

8. The method of claim 1, wherein the message further includes at least one of a reference to the binary pattern of the activation signal, technical support information, an event log, process utilization statistics, and reboot information.

9. The method of claim 1, wherein the message is broadcast by the network node.

10. The method of claim 1, wherein the message is sent to a display system of the network device, and wherein the information identifying the network node is displayed by the network device.

11. The method of claim 1, wherein the activation signal is sent by the remote node.

12. The method of claim 1, wherein the unique identifier is inferred from a source address of the message.

13. A device for use in a network, the network including a plurality of network nodes, the device comprising:
    a memory;
    a processor coupled to the memory;
    a sensor coupled to the processor, wherein the sensor is configured to receive an activation signal from a tagging device; and
    an asynchronous interrupt message detector coupled to the sensor, wherein the asynchronous interrupt message detector is configured to generate, by the processor, a message including information identifying the device upon receiving the activation signal, wherein a unique identifier corresponding to the device is initially determined by the tagging device and a remote node of the network based on the message, wherein the device is organized into a group by the remote node, and wherein a binary pattern of the activation signal maps to the group.

14. The device of claim 13, wherein the activation signal was generated as a result of operation of a laser device in a pulsed mode.

15. The device of claim 13, wherein the information identifying the device includes one of the unique identifier corresponding to the device and data which distinguishes the network node.

16. The device of claim 13, wherein the asynchronous interrupt message detector is further configured to:
    determine one or more predefined procedures mapped to the binary pattern.

17. The device of claim 13, wherein one or more actions are performed at the remote node upon receiving the message, and wherein the binary pattern of the activation signal maps to the one or more actions.

18. A non-transitory computer-readable medium storing a plurality of instructions to identify a network node of a network, the network including a plurality of network nodes, the plurality of instructions when executed cause a computer system to:
    receive an activation signal by the network node, wherein each network node of the plurality of network nodes corresponds to a unique identifier; and
    send a message including information identifying the network node in response to receiving the activation signal, wherein the unique identifier corresponding to the network node is initially determined by a remote node of the network based on the message, wherein the network node is organized into a group by the remote node, and wherein a binary pattern of the activation signal maps to the group.

19. The non-transitory computer-readable medium of claim 18, wherein the plurality of instructions when executed further cause the computer system to:
    determine one or more predefined procedures mapped to the binary pattern; and
    perform the one or more predefined procedures at the network node.

* * * * *